June 13, 1933.  L. B. GREEN  1,914,253
LOUVER-TYPE GRILLE FOR AUTOMOBILE RADIATORS
Filed Dec. 7, 1932  2 Sheets-Sheet 1
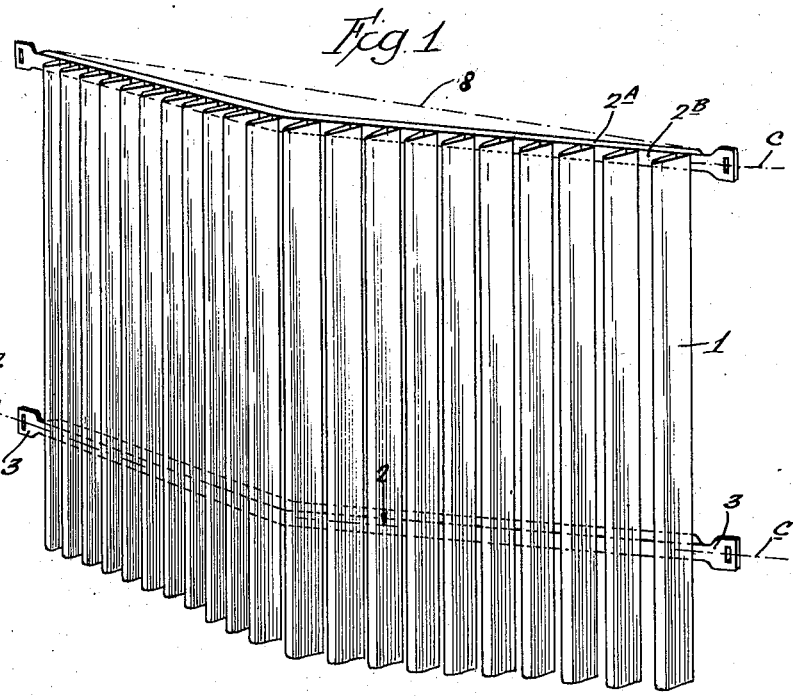
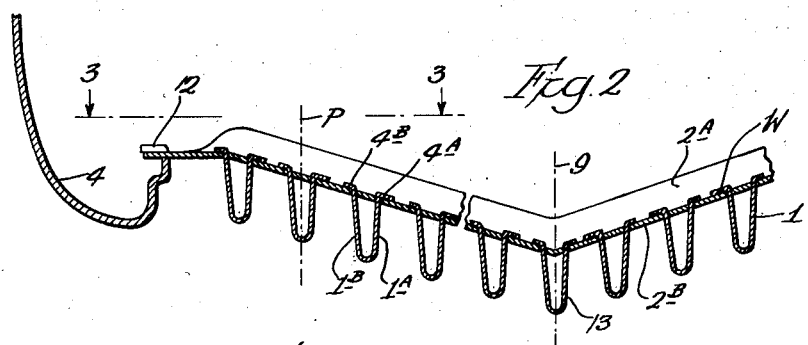
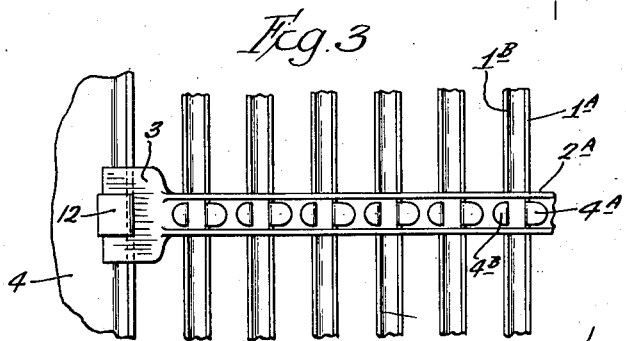
Inventor:
Lee B. Green

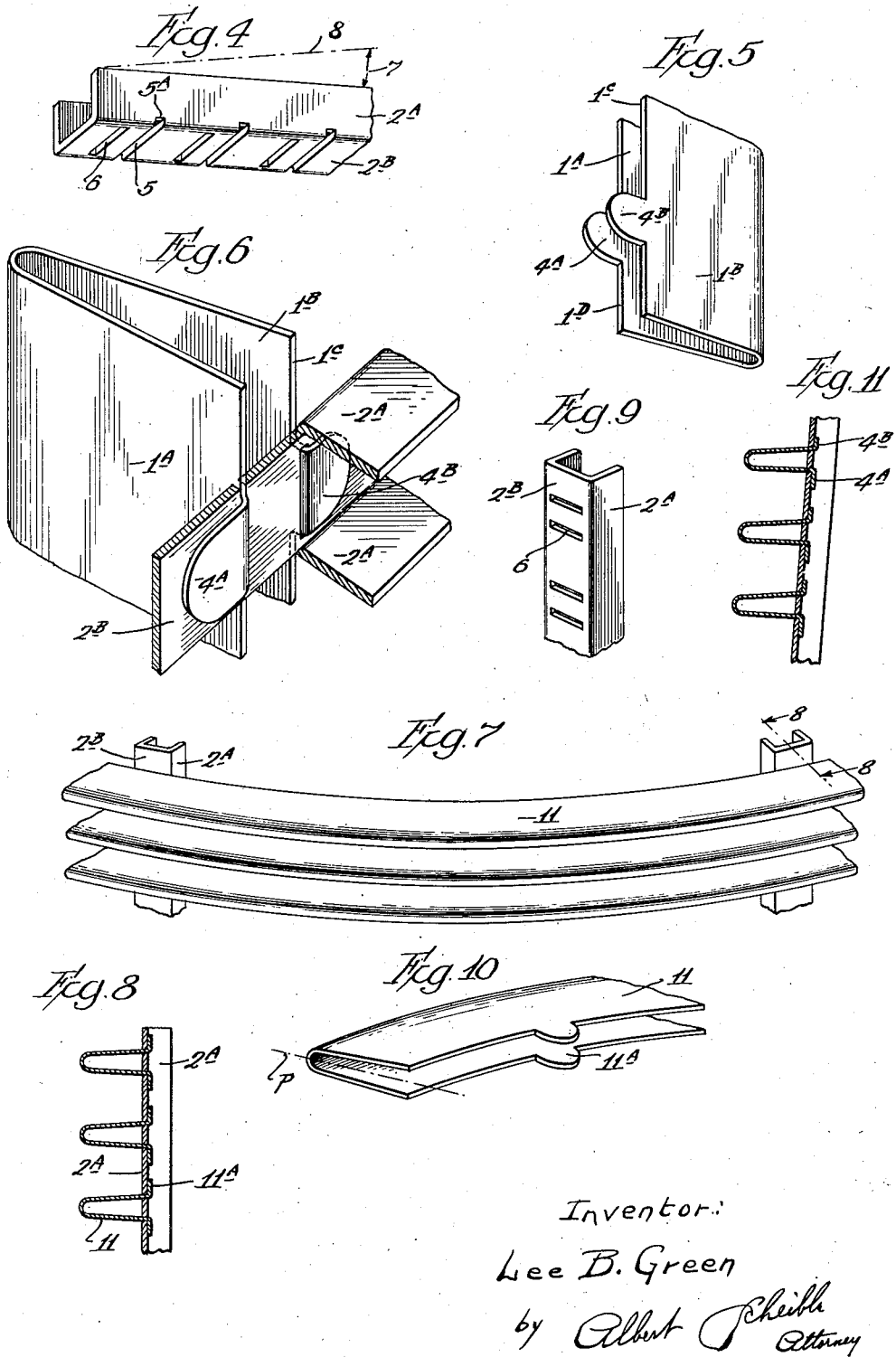

Patented June 13, 1933

1,914,253

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

LOUVER-TYPE GRILLE FOR AUTOMOBILE RADIATORS

Application filed December 7, 1932. Serial No. 646,160.

My invention relates to the class of grilles in which louver bars which are parallel (or which at least extend in the same general direction) are connected to each other by cross-bars, and in one of its general objects aims to provide an inexpensive and easily manufactured grille of this type which will permit an expeditious fastening of the cross-bars to the louver bars without requiring any welding, brazing or the use of rivets. Furthermore, my invention aims to provide a grille construction of this class which can be employed with equal facility in a substantially flat front grille (namely one in which the forward edges of the louver bars are all in a common plane), with a grille in which these forward bar edges are disposed in two diverging planes to present a so-called V-front appearance, or one in which the forward bar edges are disposed in a part of a common cylindrical or conical surface.

In some still further aspects, my invention aims to provide a grille construction which will permit the interchangeable use of identical louver bars (cheaply formed of sheet metal) for grilles affording the just recited three different front effects. My invention also aims to provide a grille construction of the above mentioned general class which will adequately stiffen (even when the louver bars are formed of light sheet metal) without requiring the use of side frame members for connecting the end bars of the grille. In addition, my invention aims to provide a louver-type grille construction in which a cross-bar can serve both as a substitute for heavier and more expensive side frame members of the grille and as part of the means for anchoring the grille to a frontal member which affords the opening guarded by the grille.

In automobile practice it has long been customary to mount a grille in front of the radiator of the car as an effective means for preventing a damaging of the radiator by gravel tossed up by more forward cars, and for preventing twigs or leaves from reaching and clogging the air passages of the radiator; and the use of such so-called radiator grilles has also been stimulated in recent years by the fact that they largely conceal the radiator.

Since the jolting and swaying of an automobile over any poor road is apt to impose violent strains on such a grille, it has heretofore been customary to form the louver bars of considerably heavier stock than would otherwise be required for enabling the grille to resist the impact of objects projected against it. It has likewise been customary to mount the louver bars in a complete frame, and to employ welding or brazing operations for insuring a rigid connection of the ends of the louver bars to opposite ends of the frame. Consequently, the weight, cost of manufacture, and total cost of such grilles has been undesirably high, and these factors have particularly retarded the adoption of louver type grilles in connection with radiator fronts of non-planar form, such as V-front forms which have grown in popularity in recent years.

My present invention aims to overcome all of the just recited handicaps to the adoption of louver type grilles in connection with automobile radiator fronts of non-planar types, without introducing any new objections. Furthermore, my invention aims to provide an inexpensive but rigid louver bar and cross-bar assembly particularly suitable for grilles directly interlocked with portions of radiator shells after the general manner disclosed in my copending application #646,161, filed December 7th, 1932, on a radiator front and grille assembly for automobiles.

Illustrative of my invention,

Fig. 1 is a frontal perspective view of an automobile radiator grille embodying my here presented invention and also designed so as to be anchored to a radiator shell front by integral hooks on that front.

Fig. 2 is a fragmentary and enlarged horizontal section, taken along the line 2—2 of Fig. 1 and also including an adjacent portion of a radiator shell front supporting the grille.

Fig. 3 is a fragmentary rear elevation taken from the line 3—3 of Fig. 2.

Fig. 4 is an enlarged frontal perspective view of the left-hand portion of one of the horizontal bar members in the left-hand portion of the grille of Figs. 1 to 3.

Fig. 5 is an enlarged perspective view of a tabbed portion of one of the upright louver bars or blades of Figs. 1 to 3, taken somewhat from the rear of the blade.

Fig. 6 is a still more enlarged perspective view showing adjacent parts of a horizontal bar member and a louver blade, with portions broken away.

Fig. 7 is a frontal perspective view showing a portion of an embodiment of my invention having upright cross-bars and forwardly convexed louver blades disposed so that the medial plane between the webs of each blade is horizontal.

Fig. 8 is a vertical section taken through Fig. 7 in the medial plane between the two channel webs of one of the cross-bars.

Fig. 9 is a fragmentary rear perspective view of one of the upright cross-bars of Figs. 7 and 8, showing the slots through which tabs on the louver blades extend.

Fig. 10 is an enlarged perspective view of a portion of one of the louver blades of Fig. 7, taken from the rear.

Fig. 11 is a section allied to Fig. 8, showing a portion of a grille of the type of Fig. 7, but with the stiffening bars sloping downwardly forward and provided with alternate slots and grooves after the manner of Fig. 4.

In the drawings, Fig. 1 shows the upper two-thirds of a louver-type grille consisting of upright louver blades 1 directly interlocked with channel-sectioned cross-bars, in which cross-bars the channel webs are designated as 2A and the channel backs as 2B. Each of these cross-bars is bent at its middle to give the grille a V-front effect, and each cross-bar also has an eye 3 at each end for cooperating with a hook finger 12 on the corresponding radiator shell 4 to support the grille from the shell after the manner disclosed and claimed in my previously mentioned copending application #646,161.

Each such cross-bar preferably has the entire portion between its eyes of a channel section presenting its channel-back 2B upright and at its front, and having its vertically spaced channel webs 2A extending rearwardly from the said channel-back. Each louver blade consists initially of a sheet metal strip bent along its longitudinal medial line to a substantially U-shaped section and having counterpart tabs 4A and 4B projecting rearwardly respectively from the free edges of the webs 1A and 1B of the louver blade.

These pairs of tabs on each louver blade have their center lines spaced from each other by distances corresponding to the distances between the longitudinal center lines C (Fig. 1) of the channel-backs 2B of the cross-arms. Each cross-arm has its channel-back provided adjacent to each louver with two perforations through which the two adjacent tabs on that louver can be slid, each tab being sufficiently longer than the thickness of the channel-back so that its free end portion can thereafter be clinched against that back.

To allow of such a simple interlocking assembly of louver blades and cross-bars with louver blades of symmetrical cross-section while also permitting the medial planes P of the louver blades (with the possible exception of a central louver blade) to be oblique to the front face of the channel-back 2B of each cross-arm, I desirably employ an open-end transverse groove 5 and a shorter closed-end slot 6 to constitute each pair of the tab-receiving formations in the major portion of each cross-arm.

Thus, in a left-hand portion of a cross-bar as shown in Fig. 4, the perforation nearest to the side edge of the grille consists of an upright slot 6 of such a cross-section that the corresponding tab 4B on an adjacent louver blade can readily be slid through it until the free edge 1C (Fig. 6) of the blade web carrying that tab engages the forward face of the channel-back of the cross-bar. However, the companion tab-receiving formation 5 extends for the entire width of the channel-back of the cross-arm, and is open at both ends (as in Fig. 4) after the manner of a rearwardly open groove having the major portion of its bottom cut away. Owing to this extended length of the slot 5, the tab 4A on the louver blade web nearest to the center line of the grille can be slid through this slit until the free edge 1B of the blade web 1D carrying that tab sets on two shoulders 5A in the channel webs 2A of the cross-bar, which shoulders are alined bottom portions of the said groove.

By making the saw slot 5 of a suitable depth, the resulting relative displacement of the rear edges of the two webs of the louver blade from the plane of the frontal face of the cross-bar can readily correspond to the angle 7 (Fig. 4) at which that lateral half of the cross-bar is to extend with respect to an upright plane 8 at right angles to the medial planes P (Fig. 2) of the louver blades in that lateral half of the grille. When the suitably long tabs then have their free ends clinched against the rear face of the channel-back 2B of the cross-arm, each tab 4B which extends through one of the shorter slits 6 will present a shorter tip portion behind that channel-back than the corresponding tab 4A which extends through one of the saw slots 5, as shown in Figs. 2, 6 and 8. Since this is readily permitted by making all of the tabs of adequate length, I can readily employ louver blades in which the webs are symmetrical and in which the tabs are all counterparts of each other, thereby simplifying the manufacture.

In the right-hand half of the same grille, the positions of the perforations in each cross-bar would be the reverse of that shown in Fig. 4, namely with each saw slot 5 to the left of the corresponding shorter slit 6; so that with tabs of uniform length, the clinching or cross-arm engaging tab portion on the blade web nearest the vertical mid-plane 9 of the grille (Fig. 2) would always be longer than the corresponding tab portion on the other web of the same blade. And if the louver blades are to be distributed so that the central blade 13 has this vertical mid-plane of the grille as its own medial plane, I can readily provide for this by providing each cross-bar with a central pair of either type of the said perforations, as also shown in Fig. 2.

With half of the tabs slidably interfitting the shorter slits 6, and with rear blade web portions adjacent to the other tabs fitted into the end portions of the saw slots 5, this interfitting alone may cooperate amply with the said clinching of the said tab tips for rigidly anchoring the blades to the cross-bars, since such an interfitting prevents any vertical shifting of the blades on the cross-arms and also prevents the blades from tilting in any direction with respect to the cross-bars. Thus, my heretofore described simple and expeditious assembly of the blades and cross-arms in itself affords a rigid grille construction. However, part or all of the turned-over tip portions of the tabs may also be spot welded to the cross-bars, as shown at W in Fig. 2, as an added precaution.

While I have heretofore described my novel grille construction as used in connection with a V-front grille in which the louver bars are upright while the cross-bars are horizontal, the general features of this construction can also be employed for grilles of many other types. For example, Fig. 7 is a fragmentary frontal perspective view of a grille in which the cross-bars 2 are upright and in which the U-sectioned louver bars extend horizontally and are forwardly convexed so as to present the quarter-cylinder "Barrel front" effect afforded by my grilles as used on the "De Soto" automobiles. In this embodiment, the louver blades 11 are provided on both webs with rearwardly projecting tabs 11A, as shown in the fragmentary rear perspective view of Fig. 10, these tabs being disposed in pairs after the general manner of the blades of Fig. 5.

If the medial plane P of each blade is to be at right angles to the forward face of upright cross-bars 2, all of the tab-receiving perforations in each cross-bar are short slits 6 (as shown in Fig. 9), through which slits the tabs are slidably inserted, and the clinched tabs 11A all present portions of equal length behind the channel-backs of the cross-bars as shown in Fig. 8.

To produce a downwardly forward sloping effect with the horizontal and forwardly convexed louver blades of Figs. 7 and 10, the grille manufacturer would merely substitute the slit and saw-slot formations on the cross-bar of Fig. 4 for that of Fig. 9, with each slot above the saw-slot associated with the same louver blade, so that Fig. 10 would show the vertical section corresponding to that of Fig. 8.

Since Fig. 1 shows only the upper two-thirds of one type of grille embodying my invention, it will be obvious that this grille may have a lower cross-bar similar to the upper one, thereby afford rigid spacings and supports for the louver blades both at their ends and at mid-height, so that no side frame members are needed. However, I do not wish to be limited as to the extent to which such blade-interlocked cross-bars are used in any grille, since such bars could also be used for louver type grilles in which the end cross-bars are of a different type. Nor do I wish to be limited to other details of the construction and arrangement here disclosed, since many changes might be made without departing either from the spirit of my invention or from the appended claims.

I claim as my invention:

1. A louver type grille comprising substantially parallel louver blades and cross-bars extending transversely of the said blades behind the latter; each louver blade being of a rearwardly open channel section presenting channel webs and having tabs projecting from opposed portions of the rear edges of the two webs; each cross-bar having slots through which the said tabs respectively extend and having frontal portions adjacent to the said slots bearing against the said rear edges of the webs, the free end portion of each tab being bent against the adjacent cross-bar to anchor the blade to the cross-bar.

2. A louver type grille as per claim 1, in which the opposite tabs on the two webs are bent away from each other.

3. A louver type grille comprising substantially parallel louver blades, and cross-bars extending transversely of the said blades behind the latter and secured to the said blades; each louver blade being of a rearwardly open channel section presenting channel webs spaced longitudinally of the cross-bars; each cross-bar having its channel-back provided in its forward face with grooves extending transversely of the cross-bar and in which grooves rear portions of one web of each louver blade is socketed.

4. A louver type grille as per claim 3, in which the louver blades have tabs projecting from the rear edges of each of their said webs and in hooking engagement with the cross-bars.

5. A louver type grille comprising substantially parallel louver blades, and a cross-bar extending transversely of the blades behind the latter and secured to the blades; each blade being of a rearwardly open U-section and including two webs both of which webs have rear edge portions abutting against forwardly facing portions of the cross-bar; the cross-bar having on its forward face transverse slots alining with and housing rear portions of only one web of each louver blade, the other webs of the louver blades abutting rearwardly against the forward face of the cross-bar.

6. A grille as per claim 5, in which each of the said slots corresponds closely in its width to the thickness of the web portions housed by it.

7. A louver type grille comprising substantially parallel louver blades each of a U-section presenting rearwardly directed webs, each louver blade having spaced tabs projecting rearwardly from the rear edge of at least one of its said webs, and a channel-sectioned cross-bar extending transversely of the said blades behind the blades and having its channel-back engaging rear edge portions of both webs of each blade; the cross-bar having its channel-back provided with parallel slots transverse of the cross-bar and through which slots the said tabs extend, and each tab having its rear end portion clinched against the rearward face of the channel-back of the cross-bar; the slots opposite the rear edge of one web of each louver blade being open ended, and the slots opposite the other rear web edge being relatively shorter and presenting end walls respectively engaged by the edges of the tabs extending through the last named slots.

8. A louver type grille comprising substantially parallel louver blades each of a rearwardly open U-section and presenting counterpart webs, and a cross-bar extending transversely of the said blades, each of the said blades having the rear edges of both webs thereof abutting rearwardly against the forward face of the cross-bar, the cross-bar being formed so that at least a part of the length of the cross-bar portion engaged by one web edge of each louver blade is offset rearwardly of the cross-bar from the cross-bar portion engaged by the other web edge, thereby disposing the medial planes of the blades oblique to the forward face of the said part of the cross-bar.

9. A V-front louver type grille comprising a substantially horizontal cross-bar of rearwardly open V-shaped horizontal section, and two sets of generally upright U-sectioned louver blades extending in front of and respectively secured to the two lateral halves of the said cross-bar, the blades of each set having their medial planes substantially parallel to each other; the cross-bar having forwardly open upright slots respectively housing rear portions of the blade webs nearest the medial vertical plane of the grille, the other blade webs abutting against unslotted frontal portions of the cross-bar; the depth of the said slots being such that the angle between the front face of each lateral half of the cross-bar and the medial plane of the blades secured to that bar half is half the difference between 180 degrees and the angle at which the two halves of the cross-bar diverge from each other to afford the said V-shaped section of the cross-bar.

10. A louver type grille comprising louver blades extending in the same general direction, each blade being of a rearwardly open and substantially U-shaped section presenting two webs of equal width spaced from each other at their rear edges, and each blade having tabs projecting from substantially opposite portions of the rear edges of the two webs; and a blade-connecting member extending transversely of the blades behind the latter, portion of the said member being hookingly engaged by each of the said tabs, the said member having other forwardly facing portions adjacent to the said tabs bearing against the rear edges of the said blade webs, the said other portions being staggered in most portions of the said member so that the portion engaging the rear edge of one web of a louver blade is farther forward than the portion engaging the rear edge of the other web of the same blade.

Signed at Cleveland, Ohio, December 5th, 1932.

LEE B. GREEN.